July 24, 1951  B. B. BACHMAN ET AL  2,561,901
ADJUSTER, TRACK TENSION
Filed Dec. 18, 1945  3 Sheets-Sheet 1

INVENTOR.
BENJAMIN B. BACHMAN
DONALD J. MACKLIN
BY
J. H. Church & H. E. Thibodeau
ATTORNEYS

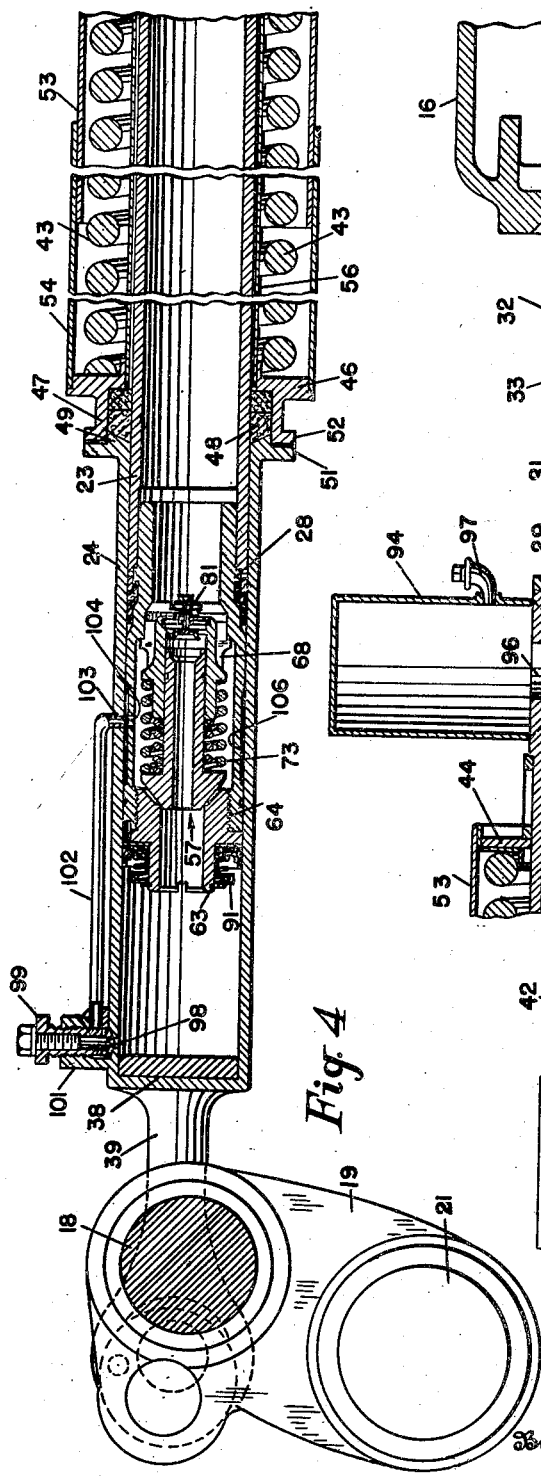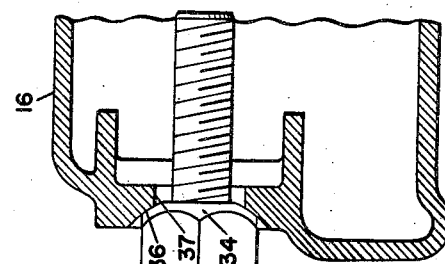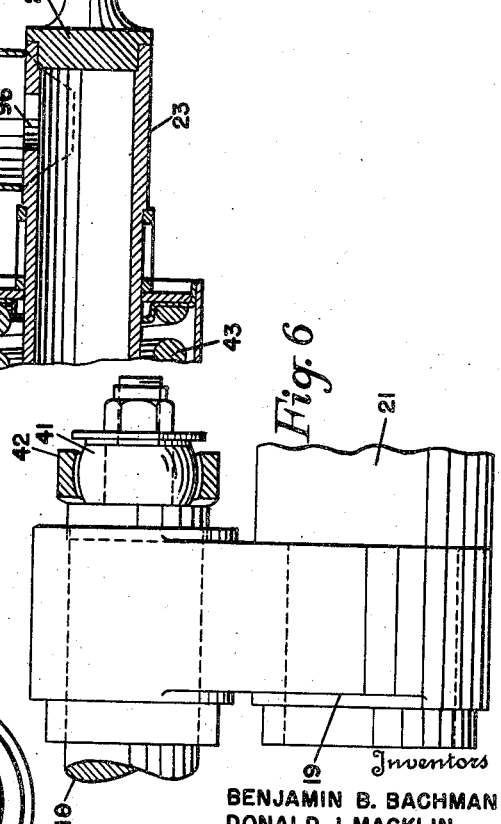

July 24, 1951 B. B. BACHMAN ET AL 2,561,901
ADJUSTER, TRACK TENSION
Filed Dec. 18, 1945 3 Sheets-Sheet 3

INVENTOR.
BENJAMIN B. BACHMAN
DONALD J. MACKLIN
BY
J. H. Church & H. E. Thibodeau
ATTORNEYS Patented July 24, 1951

2,561,901

UNITED STATES PATENT OFFICE 2,561,901

ADJUSTER, TRACK TENSION

Benjamin B. Bachman, Philadelphia, and Donald J. Macklin, St. Davids, Pa.

Application December 18, 1945, Serial No. 635,761

4 Claims. (Cl. 305—9)

This invention relates to band and link track vehicles and to maintaining the tracks thereof under proper tension. When vehicles of this kind traverse uneven ground, the changing contours thereof may subject the tracks to wide variations in tension. If the track becomes too loose, it may jump off the sprockets, while if the track is too tight, it, as well as other elements of the suspension system, are subjected to excessive loads. When the brakes are applied and also when the vehicle is operated in reverse, the resulting track tension imposes a very heavy load on the idler wheel. The translational movement of the idler wheel under the influence of this load must be adequately resisted to maintain proper track engagement with the driving sprocket. It is also necessary that the desired tension in the track be maintained at the suspension elements tend to move in traveling over changing contours of uneven ground. It has not been possible to provide a spring having characteristics which enable it to respond properly to maintain the desired track tension throughout the wide range and practically unpredictable sequence of innumerable and rapidly variable conditions, the transition to which usually requires a substantially continual succession of incremental and particular track tension adjustments instantaneously attaining adequate magnitude for efficient operation.

The purposes of the present invention are to increase the efficiency of vehicles of the class described by improving the art of tensioning the tracks thereof.

The invention provides for utilizing the elastic properties of a suitable spring for maintaining proper track tension, when the movements of the suspension elements tend to permit the track to become slack. Whenever the movements of the suspension elements, or the application of the brakes, or the operation of the vehicle in reverse, tend to increase the track tension, movement of the idler wheel under the influence of these abnormal loads is prevented by reinforcing the spring through the resistance provided by a hydraulic check. When pressure in the hydraulic check arises to a predetermined value limited by suitable relief valve, the resistance provided by the hydraulic check is relieved so that excessive tension in the track can be prevented. When the causes for this excessive tension have been removed, the normal tension on the track is restored by means of the spring pushing the idler back into normal position and carrying the piston of the hydraulic check back into a position where the fluid pressure is substantially zero. After relatively small movements of the idler wheel under the influence of the spring to maintain normal track tension, the hydraulic check will prevent return of the idler to normal position. To permit such return, the hydraulic check is constructed in such a manner as to provide a small leakage of the fluid past the piston from the high pressure zone to the low pressure zone.

The features of the invention are shown in the accompanying drawings, wherein.

Figure 7:
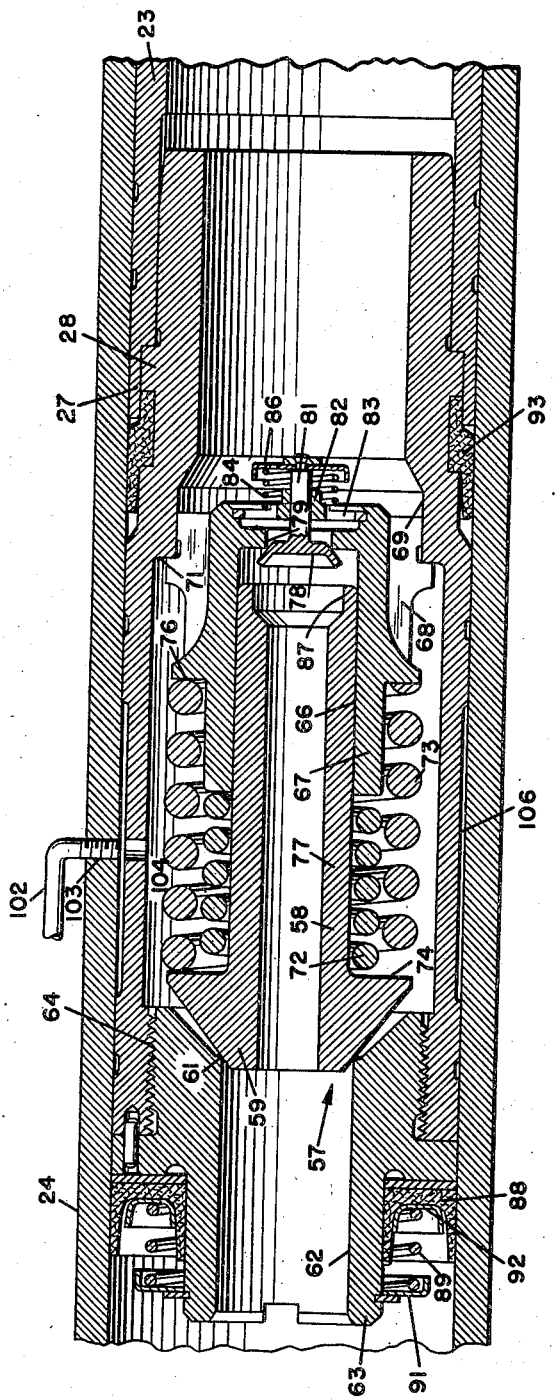

Figs. 4 and 5 together are a longitudinal vertical section to an enlarged scale through the track tension adjusting means;

Fig. 6 is a front elevation, with parts in section, to an enlarged scale of the oscillatory arm for supporting the idler wheel and the pivotal connection thereto, and Fig. 7 is a central longitudinal vertical section to an enlarged scale, through the valve mechanism of the tension adjusting means.

In the embodiment selected for illustration, a vehicle in the form of a half-track, indicated generally at 10 (Fig. 1) is equipped with a drive sprocket 11 and an idler wheel 12 for cooperative engagement with the band track 13. Groups of bogie wheels 14 may be disposed along the lower run of the track for cooperative engagement therewith. A body suspension bracket 16 may be mounted on the frame 17 of the vehicle and a suitable bogie wheel suspension system 20, preferably of the type disclosed in our copending application, Serial No. 634,280, filed December 11, 1945, now Patent No. 2,458,549, issued January 11, 1949, may be operatively connected between this suspension bracket and the bogie wheels for supporting the vehicle.

Figure 1:
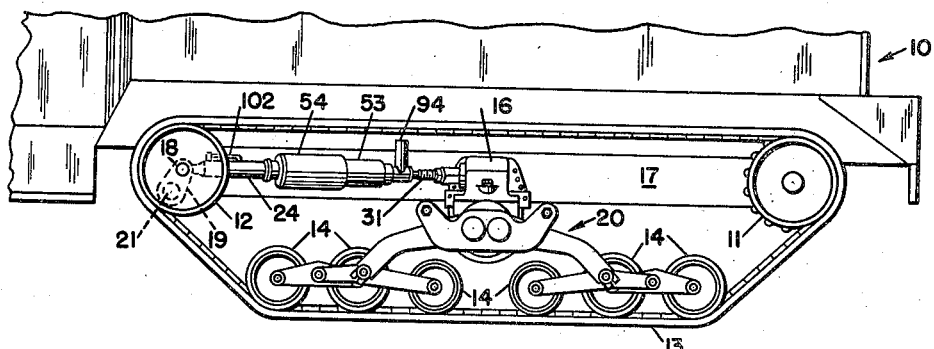
Fig. 1 is a side elevation of a portion of a half-track, illustrating the track suspension system and the track tension adjusting relation.
Figure 2:
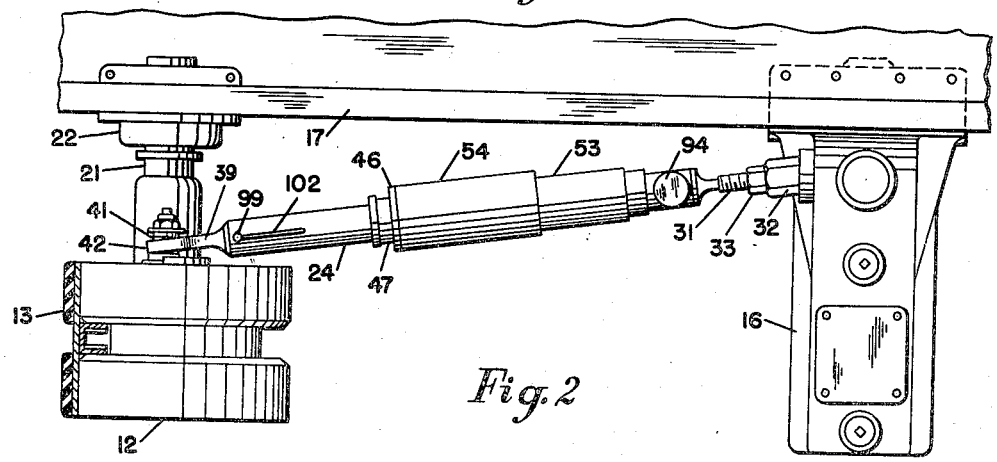
Fig. 2 is a plan view to an enlarged scale showing the track tension adjusting means connected between the idler wheel and the body suspension bracket.
Figure 3:
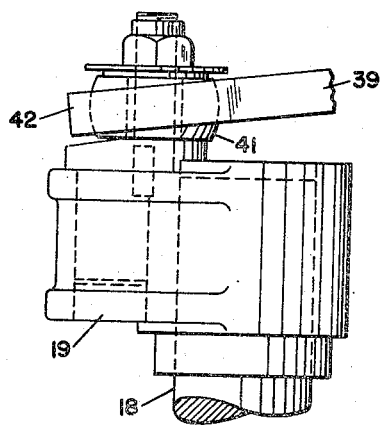
Fig. 3 is a top plan view to an enlarged scale of the pivotal connection between the track tension adjusting means and the oscillatory arm carrying the idler wheel.

As shown in Fig. 1, track 13 has its normal contour length. As the vehicle traverses uneven ground one or more of the bogie wheels may rise or descend a variable distance depending upon the contour of the ground, and obviously different bogie wheels may rise or descend the same or different distances concurrently. It will be seen that such bodily movement of the bogie wheels produces changes in the contour length of the track. To provide for this, idler wheel 12 may be mounted for bodily movement toward and away from track 13. As shown in the drawings, idler wheel 12 may be rotatably mounted on a stub shaft 18 affixed to an oscillatory arm 19 fixedly mounted on a rotary shaft 21 supported in bearings 22 carried by frame 17. It will be evident that track tension adjustments for changes in contour length of track, may be effected by adjusting the position of arm 19 about the axis of rotary shaft 21.

For effecting and maintaining track tension adjustments, hollow inner and outer members, preferably telescopically disposed tubular members 23 and 24 (Figs. 4 and 5) may be in slidable engagement to provide for relative longitudinal movement thereof. Conveniently, inner member 23 may be formed in separable sections (Figs. 4 and 7) having complementary end portions 27 and 28 interfitting preferably in abutting relation. The rear or right end of inner member 23, as viewed in Fig. 5, may be and preferably is closed, as by an end wall 29 having mounted thereon a longitudinally extending threaded rod 31 along which a bearing nut 32 is adjustable. A locking nut 33 may be provided for securing the bearing nut in selected positions of longitudinal adjustment. This bearing nut may be formed with a suitably rounded or convex end surface 34 adapted to seat in a complementary concave abutting surface 36 formed in a member fixed with the frame, as in a side wall of body suspension bracket 16, while rod 31 extends freely through a hole 37 in the side wall of the suspension bracket.

The opposite or forward end of outer member 24 may also be closed, as by an end wall 38 having mounted thereon a longitudinally extending rod 39 adapted to be connected to arm 19. A pivot bearing 41, preferably having a suitably convex or substantially spherical bearing surface, may be mounted on the outer end of oscillatory arm 19, in any approved manner, and disposed in a complementary ring or radial bearing 42 formed on the outer end of rod 39 to provide a pivotal connection between these parts.

For maintaining the desired track tension while effecting the more frequent or usual adjustments in contour length thereof, a spring 43 (Figs. 4 and 5) having characteristics suitable for the purpose, may be disposed about inner member 23 with its rear end engaging a seat 44 rigidly mounted on inner tubular member 23. The other or forward end of spring 43 may engage a seat 46 disposed about inner tubular member 23 and slidable longitudinally therealong. Preferably, movable seat 46 carries a forwardly extending cylindrical section 47 spaced from inner member 23 to form in effect a stuffing box in which suitable packing 48 may be disposed about inner member 23 and retained in the stuffing box by a suitable rearwardly extending circumferential lip 49 carried by outer tubular member 24 and fitting slidably within cylindrical section 47. Preferably, outer tubular member 24 also carries a radial flange 51 abutting a similar flange 52 carried by cylindrical section 47 of the movable spring seat. If desired, the spring may be enclosed in a casing or housing comprising telescopic cylindrical sections 53 and 54 carried by the fixed and the movable spring seats 44 and 46, respectively. The movable spring seat also preferably carries a tubular shield 56 disposed about inner member 23 and extending therealong inside the spring for a sufficient distance to prevent the latter from rubbing against and wearing away any portion of the outer surface of inner member 23 along which outer member 24 is adapted to have a sliding fit.

For controlling the volume of pressure fluid to accommodate sudden or large displacements of the idler wheel, there may be disposed in the forward portion of inner member 23 a spring loaded plunger valve 57 comprising a tubular body or stem 58 and a conical head 59 adapted to seat, preferably, with a line contact, as indicated at 61, on the end of a cylindrical port or passage 62 formed in a plug 63 secured in the forward end of inner tubular member 23, as by having threaded engagement therewith as indicated at 64. The valve body may be supported for axial sliding movement in a bore 66 formed in a spool 67 having exterior longitudinally extending shouldered ribs 68 circumferentially spaced to leave fluid passages therebetween. These ribs may be slidably disposed in a counterbore 69 with their shouldered portions abutting an internal shoulder 71 in inner tubular member 23. This plunger valve may be normally held on its seat 61 by suitable resilient means here shown as comprising concentric expansible springs 72 and 73 disposed about tubular body 58 and engaging a seat 74 formed on valve head 59. At their opposite or rear ends, the outer spring 73 may seat on an external shoulder 76 formed on spool 67, while inner spring 72 seats on the end of the spool adjacent thereto.

Flow of pressure fluid through coaxial passage 77 in valve body 58 may be controlled by a normally closed valve comprising a suitable head 78 seating preferably with a line contact over a port 79 formed in spool 67, while the stem 81 on which the head is mounted may extend freely through this port and be slidably supported for axial movement in a bearing 82 mounted at the rear end of the spool, as by means of a spider 83. A suitable spring 84 may be disposed about valve stem 81 between spider 83 and a spring seat 86 affixed to the stem at the outer end thereof for urging this valve to its closed position. The adjacent end of valve body 58 may be counter bored, as indicated at 87 to provide adequate clearance for valve head 78 in various possible relative positions of this head and plunger valve 57.

Any suitable means may be provided for maintaining inner and outer tubular members 23 and 24 substantially in fluid tight relation. As shown in the drawing, suitable packing in the form of a cup washer 88 may be retained about the reduced forward end portion of plug 63 and in engagement with the inner surface of outer tubular member 24, as by means of a coil spring 89 engaging a seat 91 affixed to the plug and a seat 92 disposed against the washer. Adjacent the joint between the separable sections of inner tubular member 23, packing 93 may also be disposed in an annular recess in the latter member for engagement with the inner surface of outer tubular member 24, for maintaining these members substantially in fluid tight relation at this point.

For supplying and replenishing pressure fluid, a suitable reservoir 94, preferably having an atmospheric vent (not shown), may be mounted on the rear projecting end of inner tubular member 23 and in communication therewith through a port 96. This reservoir may be equipped with a filling neck or spout 97 disposed at a level to maintain the desired static head on fluid in the system.

On the upper side of outer tubular member 24 at the forward end thereof a suitable orifice 98 may be provided for the escape of gaseous media, usually air. For controlling the flow through this orifice there may be provided a suitable needle valve 99 having threaded engagement with a boss 101 for axial adjustment therein. A by-pass connection 102 may extend from the base of boss 101 to an orifice 103 substantially registering with an orifice 104 through inner tubular member 23. The outer surface of inner tubular member 23 may be cut away as indicated at 106 to assure communication between orifices 103 and 104 in the various relative positions thereof.

Operation

In using the track tension adjusting means described herein it will be understood that inner tubular member 23 and the forward portion of outer tubular member 24 ahead of plug 63 are filled with a non-compressible fluid, such as oil, and the reservoir may be filled to the level determined by the location of the filling neck therefor. When the apparatus is first set up and also after a period of extended use, there may be some entrapped air or the like in the forward end of outer tubular member 24. By opening needle valve 99 and oscillating arm 19 the oil may be agitated sufficiently to cause this entrapped air to escape through by-pass 102, orifices 103 and 104, between ribs 68 to fluid to the rear of valves 57 and 78, whence it may find its way to atmosphere through vented reservoir 94. Once the entrapped air has been removed, needle valve 99 is closed and maintained closed until such time as the operation is to be repeated.

When the vehicle is at rest on level ground the various parts occupy substantially the positions shown in the drawings. As the vehicle passes over uneven ground, it will be seen that bodily displacement of the bogie wheels will result in changes in the contour of the track that will either increase or lessen the track tension unless the idler wheel can follow these contour changes. When the track tension tends to lessen, the idler should be moving forward to maintain the normal tension. This is accomplished by the elastic force developed by the spring 43. When this disturbing condition is removed, the idler is prevented from returning to the normal position and the track tension is temporarily increased. Leakage of fluid from the high pressure zone in the forward end of tube 24 through the central hole in valve 57 and the controlled clearance between the stem 58 and the bore 66 in spool 67, and between the ribs 68 to the low pressure fluid, permits the idler to be restored to its normal position with resultant normal track tension. When the track tension tends to increase, the idler should be permitted to move backward to relieve this increase in tension. If the action causing this increase is small in magnitude or slow in application, the leakage of fluid from the forward end of the tube 24 through the central hole in valve 57 and the controlled clearance between the stem 58 and the bore 66 in spool 67, and between ribs 68 to low pressure fluid, permits such small or slow changes.

On the other hand, if the track should pass over a large boulder or a stump, for example, so that the change in contour length of the track is relatively large, or sudden, or both, spring 43 may be unable to respond properly to maintain the desired track tension. In such a situation, hydraulic pressure will build up in the body of fluid confined by valve 57 and 78 until the attainment of a predetermined pressure, in excess of that which can be resisted satisfactorily by spring 43, causes plunger valve 57 to be forced off its seat, thereby permitting fluid to pass around the exterior of this valve and between ribs 68 to low pressure fluid which is protected from this pressure by valve 78. It will be evident that opening of plunger valve 57 permits the support for idler wheel 12 to be displaced bodily. It will also be understood that the pressure at which plunger valve 57 opens is determined by the selection and adjustment of springs 72 and 73. As the cause of such an action disappears, fluid pressures tend to equalize, plunger valve 57 closes, and the pressure differential across valve 78 may cause it to open to permit replenishment of fluid previously displaced from the forward end of outer tubular member 24. As the cause of such action disappears, the elastic force exerted by spring 43 tends to restore the idler to its normal position and the piston 106 is withdrawn from cylinder 24, the valve 57 closes on the seat 61 and fluid is drawn through valve 78 into the forward end of tube 24 until the fluid pressures are equalized. It will be understood that in actual use various combinations of the actions just described will occur.

What we claim is:

1. A track tension adjuster comprising, in combination, a pair of telescopically disposed relatively longitudinally movable hollow members in substantially fluid tight relation, means for maintaining said members filled with hydraulic pressure fluid under static head, means for transmitting track tension adjustment motion to one of said members, a spring disposed exteriorly about the other of said members and tending to longitudinally extend said members relative to each other, said spring within its limits of contraction allowing relative longitudinal retraction of said members, a spring loaded plunger valve for maintaining a body of hydraulic pressure fluid under pressure in said one of said members in pressure transmitting relationship between said members, said plunger valve being normally closed with pressures on said body of fluid within the limits of resistance of said spring, said plunger valve being openable in response to predetermined pressures on said body of fluid beyond said limits of resistance of said spring to reduce the volume of said body of fluid and thereby allow additional relative retraction of said members, and another normally closed valve openable when said plunger valve is closed in response to cessation of said pressures on said body of fluid in excess of said limits of resistance of said spring to replenish said body of fluid with hydraulic pressure fluid from said other of said members.

2. A track tension adjuster comprising, in combination, a pair of telescopically disposed relatively longitudinally movable inner and outer hollow members in substantially fluid tight relation, reservoir means in communication with said inner member for maintaining the latter filled with hydraulic pressure fluid under static head, means for transmitting track tension adjustment motion to said outer member, a spring disposed exteriorly about said inner member and tending to longitudinally extend said members relative to each other, said spring within its limits of contraction allowing relative longitudinal retraction of said members, a spring loaded plunger valve having a tubular body providing a passage therethrough for maintaining a body of hydraulic pressure fluid under pressure in said outer member in pressure transmitting relationship between said members, said plunger valve being normally closed with pressures on said body of fluid within the limits of resistance of said spring, said plunger valve being openable in response to predetermined pressures beyond said limits of resistance of said spring to reduce the volume of said body of fluid and thereby allow additional relative retraction of said members, and another valve in said tubular body normally closing said passage therethrough and openable when said plunger valve is closed in response to cessation of said pressures on said body of fluid in excess of said limits of resistance of said spring to replenish said body of fluid with hydraulic pressure fluid from said inner member.

3. In a vehicle of the class described having a track, an idler engageable with the track, and means for supporting said idler for bodily movement toward and from the track for adjusting the tension thereof, the combination therewith of a pair of telescopically disposed relatively longitudinally movable hollow members in substantially fluid tight relation, means for maintaining said members filled with hydraulic pressure fluid under static head, means for transmitting motion of the bodily movement of said idler to one of said members, means connecting the other of said members to a rigid portion of said vehicle, a spring disposed exteriorly about the other of said members and tending to longitudinally extend said members relative to each other, said spring within its limits of contraction allowing relative longitudinal retraction of said members, a spring loaded plunger valve for maintaining a body of hydraulic pressure fluid under pressure in said one of said members in pressure transmitting relationship between said members, said plunger valve being normally closed with pressures on said body of fluid within the limits of resistance of said spring, said plunger valve being openable in response to predetermined pressures on said body of fluid beyond said limts of resistance of said spring to reduce the volume of said body of fluid and thereby allow additional relative retraction of said members, and another normally closed valve openable when said plunger valve is closed in response to cessation of said pressures on said body of fluid in excess of said limits of resistance of said spring to replenish said body of fluid with hydraulic pressure fluid from said other of said members.

4. In a vehicle of the class described having a track, an idler engageable with the track, and means for supporting said idler for bodily movement toward and from the track for adjusting the tension thereof, the combination therewith of a pair of telescopically disposed relatively longitudinally movable inner and outer hollow members in substantially fluid tight relation, reservoir means in communication with said inner member for maintaining the latter filled with hydraulic pressure fluid under static head, means for transmitting motion of the bodily movement of said idler to said outer member, means connecting said inner member to a rigid portion of said vehicle, a spring disposed exteriorly about said inner member and tending to longitudinally extend said members relative to each other, said spring within its limits of contraction allowing relative longitudinal retraction of said members, a spring loaded plunger valve having a tubular body providing a passage therethrough for maintaining a body of hydraulic pressure fluid under pressure in said outer member in pressure transmitting relationship between said members, said plunger valve being normally closed with presures on said body of fluid within the limits of resistance of said spring, said plunger valve being openable in response to predetermined pressures beyond said limits of resistance of said spring to reduce the volume of said body of fluid and thereby allow additional relative retraction of said members, and another valve in said tubular body normally closing said passage therethrough and openable when said plunger valve is closed in response to cessation of said pressures on said body of fluid in excess of said limits of resistance of said spring to replenish said body of fluid with hydraulic pressure fluid from said inner member.

BENJAMIN B. BACHMAN.
DONALD J. MACKLIN.

REFERENCES CITED

The following references are of record in the file of this patent:

UNITED STATES PATENTS

| Number | Name | Date |
|---|---|---|
| 1,099,073 | Moir | June 2, 1914 |
| 1,368,652 | Pennington et al. | Feb. 15, 1921 |
| 1,714,315 | Nelson | May 21, 1929 |
| 1,861,866 | Knox et al. | June 7, 1932 |
| 2,308,404 | Thornhill | Jan. 12, 1943 |
| 2,360,748 | Whisler, Jr., et al. | Oct. 17, 1944 |

FOREIGN PATENTS

| Number | Country | Date |
|---|---|---|
| 777,611 | France | Dec. 5, 1934 |